(12) United States Patent
Welch

(10) Patent No.: US 11,262,637 B2
(45) Date of Patent: Mar. 1, 2022

(54) METHOD AND SYSTEM FOR A FREQUENCY DIVERSE DISTRIBUTED MACH-ZEHNDER INTERFEROMETER

(71) Applicant: Luxtera LLC, Carlsbad, CA (US)

(72) Inventor: Brian Welch, San Diego, CA (US)

(73) Assignee: Luxtera LLC, Wilmington, DE (US)

( * ) Notice: Subject to any disclaimer, the term of this patent is extended or adjusted under 35 U.S.C. 154(b) by 0 days.

(21) Appl. No.: 16/742,707

(22) Filed: Jan. 14, 2020

(65) Prior Publication Data

US 2020/0225553 A1 Jul. 16, 2020

Related U.S. Application Data

(60) Provisional application No. 62/792,190, filed on Jan. 14, 2019.

(51) Int. Cl.
*G02F 1/225* (2006.01)
*G02B 6/12* (2006.01)
*G02F 1/21* (2006.01)

(52) U.S. Cl.
CPC ......... *G02F 1/225* (2013.01); *G02B 6/12007* (2013.01); *G02B 2006/12123* (2013.01); *G02B 2006/12142* (2013.01); *G02B 2006/12159* (2013.01); *G02F 1/212* (2021.01)

(58) Field of Classification Search
None
See application file for complete search history.

(56) References Cited

U.S. PATENT DOCUMENTS

| | | | | |
|---|---|---|---|---|
| 8,358,940 B2 * | 1/2013 | Kucharski | ............... | H03F 1/301 398/209 |
| 8,626,002 B2 * | 1/2014 | Kucharski | ............... | H03F 1/301 398/209 |
| 8,798,476 B2 * | 8/2014 | Gloeckner | ......... | H04B 10/2587 398/140 |
| 10,425,165 B1 * | 9/2019 | Welch | ................ | H04B 10/5055 |
| 2010/0060972 A1 * | 3/2010 | Kucharski | ............ | H04B 10/541 359/290 |
| 2012/0315036 A1 * | 12/2012 | Kucharski | ............. | G02F 1/0121 398/43 |
| 2014/0186028 A1 * | 7/2014 | Kucharski | ............ | H04B 10/505 398/25 |
| 2015/0316795 A1 * | 11/2015 | Hui | ....................... | G02F 1/0121 385/2 |

(Continued)

*Primary Examiner* — Chad H Smith
(74) *Attorney, Agent, or Firm* — Patterson + Sheridan, LLP

(57) ABSTRACT

A frequency diverse distributed Mach-Zehnder Interferometer may include an optical modulator on a chip, with the modulator comprising a plurality of diodes arranged along a waveguide and with each diode driven by two or more drivers. An optical signal may be received in the waveguide, and a first modulating electrical signal may be applied to a first of the plurality of diodes using a first driver and a second modulating electrical signal may be applied to the first of the plurality of diodes using a second driver. The first electrical signal may be different from the second modulating electrical signal. The second electrical signal may have a larger voltage swing than the first electrical signal. The first electrical signal voltage swing may be 0.85 volts and the second electrical signal voltage swing may be 1.5 volts, for example. The first and second electrical signals may have different frequencies.

18 Claims, 10 Drawing Sheets

(56) References Cited

U.S. PATENT DOCUMENTS

| | | | |
|---|---|---|---|
| 2016/0211921 A1* | 7/2016 | Welch | H04B 10/541 |
| 2016/0373078 A1* | 12/2016 | Welch | H03F 1/34 |
| 2017/0126325 A1* | 5/2017 | Kucharski | G02F 1/0121 |
| 2018/0109323 A9* | 4/2018 | Welch | H04B 10/524 |
| 2018/0341164 A1* | 11/2018 | Williams | G02F 1/2255 |
| 2018/0356655 A1* | 12/2018 | Welch | H04B 10/50595 |
| 2019/0094648 A1* | 3/2019 | Williams | G02F 1/2257 |
| 2020/0081314 A1* | 3/2020 | Parvizi | G02F 1/2255 |

* cited by examiner

METHOD AND SYSTEM FOR A FREQUENCY DIVERSE DISTRIBUTED MACH-ZEHNDER INTERFEROMETER

CROSS-REFERENCE TO RELATED APPLICATIONS/INCORPORATION BY REFERENCE

This application claims priority to and the benefit of U.S. Provisional Application No. 62/792,190 filed on Jan. 14, 2019, which is hereby incorporated herein by reference in its entirety.

FIELD

Aspects of the present disclosure relate to electronic components. More specifically, certain implementations of the present disclosure relate to methods and systems for a frequency diverse distributed Mach-Zehnder Interferometer.

BACKGROUND

Conventional approaches for optical interferometers may be costly, cumbersome, and/or inefficient—e.g., they may be complex and/or time consuming, and/or may reduce yields.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for a frequency diverse distributed Mach-Zehnder Interferometer, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1:
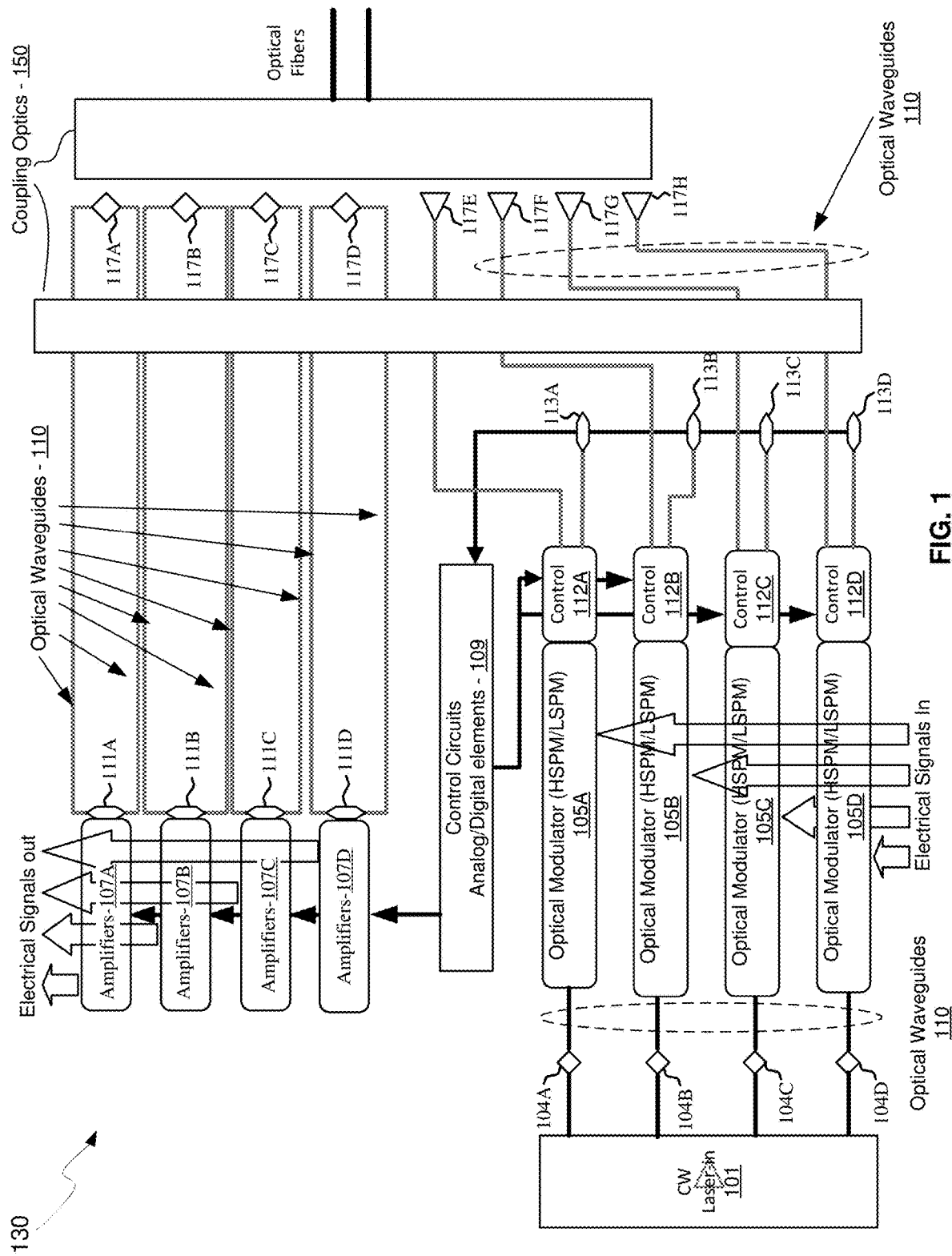
FIG. 1 is a block diagram of a photonically-enabled integrated circuit, in accordance with an example embodiment of the disclosure.

FIG. 1 is a block diagram of a photonically-enabled integrated circuit, in accordance with an example embodiment of the disclosure. Referring to FIG. 1, there are shown optoelectronic devices of a photonically-enabled integrated circuit 130 comprising optical modulators 105A-105D, photodiodes 111A-111D, monitor photodiodes 113A-113D, and optical devices comprising couplers 103A-103C and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example. Optional coupling optics 150 may comprise beam splitters, thin film filters, mirrors, prisms, etc., and may be integrated on the interposer as well as external to the interposer.

In an example scenario, the photonically-enabled integrated circuit 130 comprises one or more CMOS electronics die coupled to a CMOS photonics interposer die with a laser assembly 101 also coupled to the top surface of the interposer. The laser assembly 101 may comprise one or more semiconductor lasers with isolators, lenses, and/or rotators for directing one or more continuous-wave (CW) optical signals to the couplers 104A-104D. The CW optical signals may be at different wavelengths for CWDM operation, such as CWDM4, for example. The photonically enabled integrated circuit 130 may be integrated on a plurality of die, such as with one or more electronics die and one or more photonics die.

The grating couplers 104A-104D comprise grating structures with grating spacing and width configured to couple optical signals of a specific wavelength and polarization into the IC 130. A lens array may be incorporated between the grating couplers 104A-104D and the laser assembly 101 for focusing of the optical signal to the grating couplers for increased coupling efficiency.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode. Such one mode may have, for example, a polarization that is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

The optical modulators 105A-105D comprise Mach-Zehnder or ring modulators, for example, and enable the modulation of the continuous-wave (CW) laser input signals. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the tens of Gb/s may be desirable to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction is carefully optimized.

One output of each of the optical modulators 105A-105D may be optically coupled via the waveguides 110 to the grating couplers 117E-117H. The other outputs of the optical modulators 105A-105D may be optically coupled to monitor photodiodes 113A-113D to provide a feedback path. The IC 130 may utilize waveguide based optical modulation and receiving functions. Accordingly, the receiver may employ an integrated waveguide photo-detector (PD), which may be implemented with epitaxial germanium/SiGe films deposited directly on silicon, for example.

The grating couplers 104A-104D and 117A-117H may comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 104A-104D and 117A-117H may comprise single polarization grating couplers (SPGC) and/or polarization splitting grating couplers (PSGC). In instances where a PSGC is utilized, two input, or output, waveguides may be utilized, as shown for grating couplers 117A-117D, although these may instead be SPGCs.

The optical fibers may be epoxied, for example, to the CMOS interposer, using a fiber coupler that selectively deflects optical signals of different wavelengths to and from different grating couplers on the chip 130, with each coupler, such as each of the grating couplers 117A-117H being configured to couple optical signals of different wavelengths.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enables modulation of the CW laser signal received from the splitters 103A-103C. The optical modulators 105A-105D may require high-speed electrical signals to modulate the refractive index in respective branches of a Mach-Zehnder interferometer (MZI), for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip or a plurality of chips in a flip-chip bonded structure. An optical transceiver contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

With continued shrinking of CMOS sizes, the decreasing headroom in advanced CMOS nodes reduces the voltage swing applied to modulator 105A-105D diodes, decreasing potential phase shift per unit length. This may be overcome by splitting the modulator 105A-105D into high and low frequency domains. The low frequency domain may utilize thick oxide devices that allow higher headroom/swing, while the high frequency domain may utilize thin oxide devices with peaking that allows for higher bandwidth.

Frequency domains can be accomplished via different segments in the modulator driven by drivers for different frequencies, and/or by stacked voltage domains. Prospective benefits of this design include higher phase shift per unit length, link budget improvement, smaller transmitter size, and less sensitivity to electro-optical velocity matching.

In an example scenario, two voltage domains may be generated utilizing stacked circuits, although the disclosure is not limited to two voltage domains. Accordingly, any number of voltage domains may be utilized, dependent on the desired voltage swing of each domain and the total voltage range. Similarly, the magnitude of the voltage range in each voltage domain may be a different value than other domains.

Drivers for stacked voltage domains may comprises a cascode circuit that may be enabled to generate complementary signals to be communicated to a domain splitter, although other driver circuits may be utilized. The domain splitter may comprise a pair of stacked NFET and PFET source follower circuits, where the NFET and PFET sides may be in different voltage domains, i.e. upper and lower voltage domains. Stacked domains may be utilized to drive the lower frequency phase modulators while a single, or smaller stacked domains may be utilized to drive the low frequency phase modulators.

Figure 2:
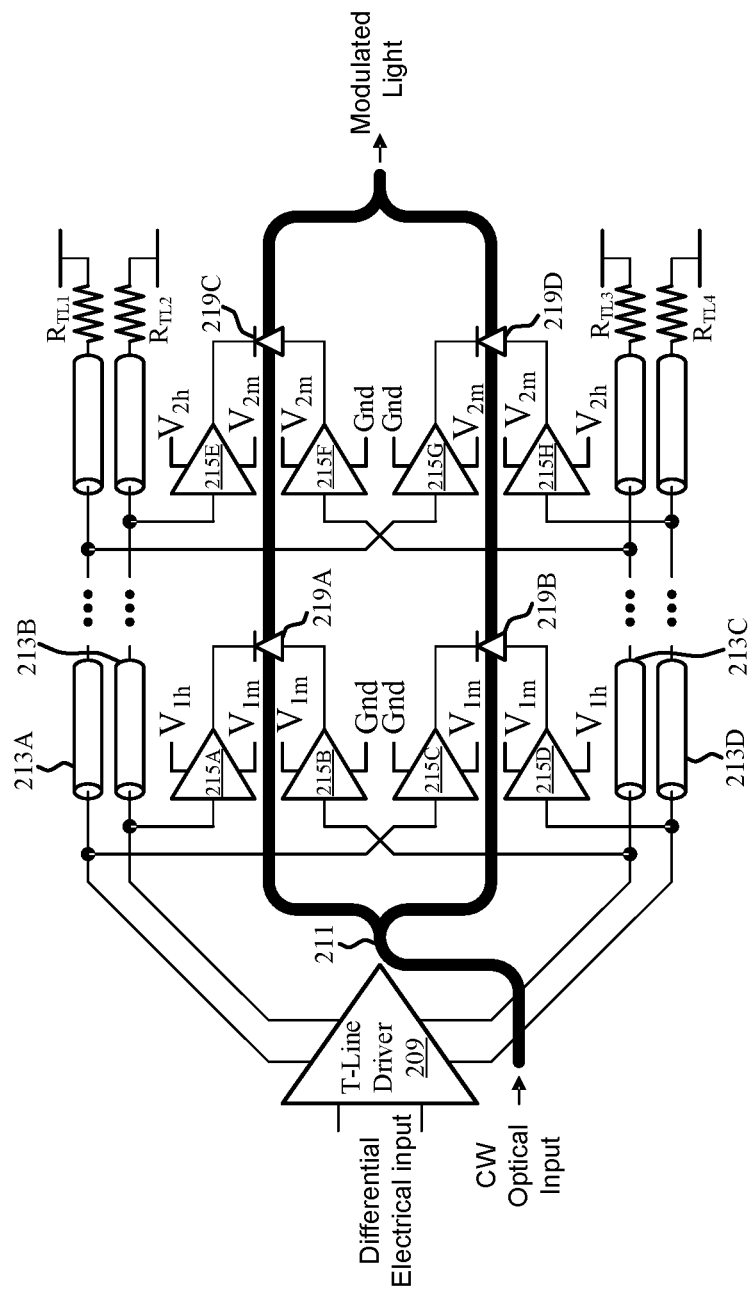
FIG. 2 is a block diagram of a split domain Mach-Zehnder modulator with global domain splitting, in accordance with an example embodiment of the disclosure.

FIG. 2 is a block diagram of a split domain Mach-Zehnder modulator with global domain splitting, in accordance with an example embodiment of the disclosure. Referring to FIG. 2, there is shown a split-domain Mach-Zehnder modulator (MZM) 200 comprising a transmission line driver 209, waveguides 211, transmission lines 213A-213D, diode drivers 215A-215H, diodes 219A-219D, and transmission line termination resistors $R_{TL1}$-$R_{TL4}$. There are also shown voltage levels $V_{1h}$, $V_{1m}$, $V_{2h}$, $V_{2m}$, and Gnd. In an example scenario, $V_{1m}$ and $V_{2m}$ are intermediate voltages between $V_{1h}/V_{2h}$ and ground, respectively, thus generating two voltage domains, due to the symmetric nature of the stacked circuits of the transmission line driver 209. The high voltages $V_{1h}$ and $V_{2h}$ may be different, one being configured for slower thick oxide transistors with the other being for faster thin oxide transistors. In an example scenario, the voltage ranges for the low and high speed drivers may be ~0-0.85V for the high speed circuits, and 0-1.5V for the low speed circuits, although other voltages are possible depending on the device size and/or oxide thickness, for example.

Furthermore, the disclosure is not limited to two voltage domains. Accordingly, any number of voltage domains may be utilized, depending for example on the desired voltage swing of each domain and the total voltage range, defined here as $V_{1h}$ or $V_{2h}$ to ground. Similarly, the magnitude of the voltage range in each voltage domain may be a different value than other domains.

The transmission line (T-line) driver 209 comprises circuitry for driving transmission lines in an even-coupled mode, where the signal on each pair of transmission lines is equal except with a DC offset. In this manner, two or more voltage domains may be utilized to drive the diodes that generate index changes in the respective branches of the MZM 200. In another embodiment, the T-line driver 209 may drive transmission lines in odd-coupled mode. Even-coupled mode may result in a higher impedance in the transmission line, whereas odd-coupling may result in lower impedance.

The waveguides 211 comprise the optical components of the MZM 200 and enable the routing of optical signals around the CMOS chip 130. The waveguides 211 comprise for example silicon and silicon dioxide, formed by CMOS fabrication processes, utilizing the index of refraction difference between Si and $SiO_2$ to confine an optical mode in the waveguides 211. The transmission line termination resistors $R_{TL1}$-$R_{TL4}$ enable impedance matching to the T-lines 213A-213D and thus reduced reflections.

The diode drivers 215A-215H comprise circuitry for driving the diodes 219A-219D, which changes the index of refraction locally in the waveguides 211. This index change in turn changes the velocity of the optical mode in the waveguides 211, such that when the waveguides merge again following the driver circuitry, the optical signals interfere constructively or destructively, thus modulating the laser input signal. By driving the diodes 219A-219D with a differential signal, where a signal is driven at each terminal of a diode, as opposed to one terminal being tied to AC ground, both power efficiency and bandwidth may be increased due to the reduced voltage swing required in each domain.

In operation, a CW, or unmodulated, optical signal may be coupled into the "CW optical Input", and a modulating differential electrical signal is communicated to the T-line driver 209. The T-line driver 209 generates complementary electrical signals to be communicated over the T-lines 213A-213D, with each pair of signals offset by a DC level to minimize the voltage swing of each diode driver 215A-215H, while still enabling a full voltage swing across the diodes 219A-219D.

Reverse biasing the diodes 219A-219D generates field effects that change the index of refraction and thus the speed of the optical signal propagating through the waveguides 213A-213D. The optical signals then interfere constructively or destructively, resulting in the "Modulated Light" output signal.

Frequency domains can be accomplished via different segments in the modulator driven by drivers for different frequencies, and/or by stacked voltage domains, such as by $V_{1h}$ and $V_{2h}$ and associated drivers 215A-215H being configured for different voltages and speeds. Prospective benefits of this design include higher phase shift per unit length, link budget improvement, smaller transmitter size, and less sensitivity to electro-optical velocity matching.

In an example scenario, the drivers 215A-215H may generate different signals for the diodes 219A-219D, with different voltage, voltage swing, frequency. For example, the drivers 215A-215H may have different CMOS transistors, some higher speed and lower voltage and some lower speed and higher voltage. Therefore, the modulated Light Out signal may comprise different frequency signals due to different drivers operating at different frequencies.

Figure 3:
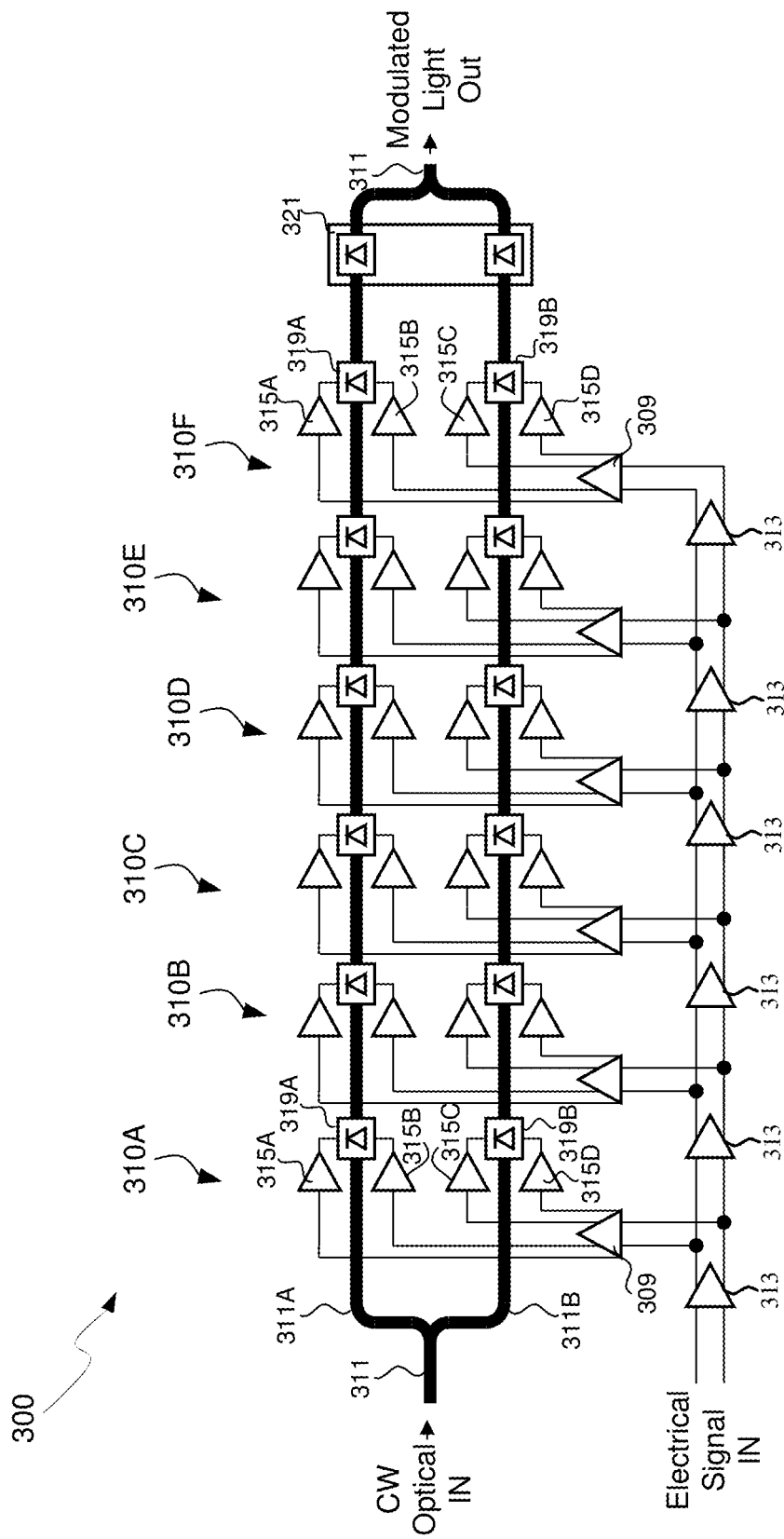
FIG. 3 illustrates a split domain Mach-Zehnder modulator with local domain splitting, in accordance with an example embodiment of the disclosure.

FIG. 3 illustrates a split domain Mach-Zehnder modulator with local domain splitting, in accordance with an example embodiment of the disclosure. Referring to FIG. 3, there is shown a locally split-domain Mach-Zehnder modulator (MZM) 300 comprising waveguides 311/311A, delay elements 313, a phase calibrator 321, and local modulator sections 310A-310F, each of which comprises a local voltage domain splitter 309, diode drivers 315A-315D, and diodes 319A and 319B. Only the first and last instances of some repeating elements are labeled in FIG. 3 for clarity.

In an example scenario, each of the local voltage domain splitters 309 may generate two voltage domains for controlling the diode drivers 315A-315D, which in turn drive the diodes 319A and 319B. The voltage domains may be symmetric about a voltage, $V_d$, which in an example scenario may be equal to a voltage of $V_{dd}/2$, thus generating two voltage domains within a supply voltage \ha. Each pair of drivers along the length of the waveguides 311A and 311B may utilize different voltages, or each driver within a pair may have different operating voltages.

Furthermore, the disclosure is not limited to two voltage domains. Accordingly, any number of voltage domains may be utilized, depending for example on the desired voltage swing of each domain and the total voltage range, defined here as \ha to ground, where \ha may be different for different sets of drivers. Similarly, the magnitude of the voltage range in each voltage domain may be a different value than other domains.

The waveguides 311, 311A, and 311B comprise the optical components of the MZM 300 and enable the routing of optical signals around the CMOS chip 130. The waveguides 311, 311A, and 311B comprise for example silicon and silicon dioxide, formed by CMOS fabrication processes, utilizing the index of refraction difference between Si and $SiO_2$ to confine an optical mode in the waveguides 311, 311A, and 311B.

The six sets of diode drivers 315A-315D may comprise circuitry for driving the diodes 319A and 319B, which changes the index of refraction locally in the waveguides 311A and 311B. This index change in turn changes the velocity of the optical mode in the waveguides 311A and 311B, such that when the waveguides merge again into the single waveguide 311 following the driver circuitry, the optical signals interfere constructively or destructively, thus modulating the laser input signal, CW optical IN. By driving the sets of diodes 319A and 319B with a differential signal, where a signal is driven at each terminal of a diode, as opposed to one terminal being tied to AC ground, both power efficiency and bandwidth may be increased due to the reduced voltage swing required in each domain.

In an example scenario, the drivers 315A-315D may generate different signals for the diodes 319A-319B, with different voltage, voltage swing, frequency. For example, the drivers 315A-315D may have different CMOS transistors, some higher speed and lower voltage and some lower speed and higher voltage. Therefore, the modulated Light Out signal may comprise different frequency signals due to different drivers operating at different frequencies.

The phase calibrator 321 may comprise individually addressable diodes in each waveguide 311A and 311B that may be operable to adjust the phase delay of the optical signal travelling in the waveguides 311A and 311B. The delay elements 313 may comprise CMOS delay elements, such as inverters or buffers, for example, for configuring the time delay of electrical signals to each of the local modulator sections 310A-310F. In the example shown in FIG. 3, the delay elements receive a single input for the series-connected delay elements.

In operation, a CW, or unmodulated, optical signal may be coupled into the "CW optical In" input, and a modulating differential electrical signal may be coupled to the "Electrical Signal IN" input. The received electrical signal may then be communicated to the local modulator sections 310A-310F via the delay elements 313. In another example, different signals may be communicated on each line, so that different signals may be coupled to the drivers 315A-315D.

The local voltage domain splitters 309 may generate output signals offset from each other by a DC level to minimize the voltage swing of each diode driver 315A-315D, while still enabling a full voltage swing across the diodes 319A and 319B in each modulator section 310A-310F. In an example scenario, each of the local voltage domain splitters 309 may receive a differential input signal and generate two differential output signals. In another example, different frequency signals may be communicated using the different lines, such that sets of drivers may drive different frequency modulating signals to the diodes.

In an example scenario, the domain splitters may comprise a pair of stacked of NFET and PFET source follower circuits, where a drain of one NFET coupled to a drain of one of the PFETs are coupled to a voltage domain boundary so that each pair then operates in a different voltage domain. Such a circuit is described in further detail in U.S. application Ser. No. 14/922,916, which is incorporated herein by reference in its entirety.

Reverse biasing the diodes 319A and 319B generates field effects that change the index of refraction and thus the speed of the optical signal propagating through the waveguides 311A. The optical signals then interfere constructively or destructively, resulting in the "Modulated Light" signal, which may comprise a non-return-to-zero (NRZ) signal, for example.

Frequency domains can be accomplished via different segments in the modulator driven by drivers for different frequencies, and/or by stacked voltage domains and associated drivers 315A-315D being configured for different voltages and speeds. Prospective benefits of this design include higher phase shift per unit length, link budget improvement, smaller transmitter size, and less sensitivity to electro-optical velocity matching.

Figure 4:
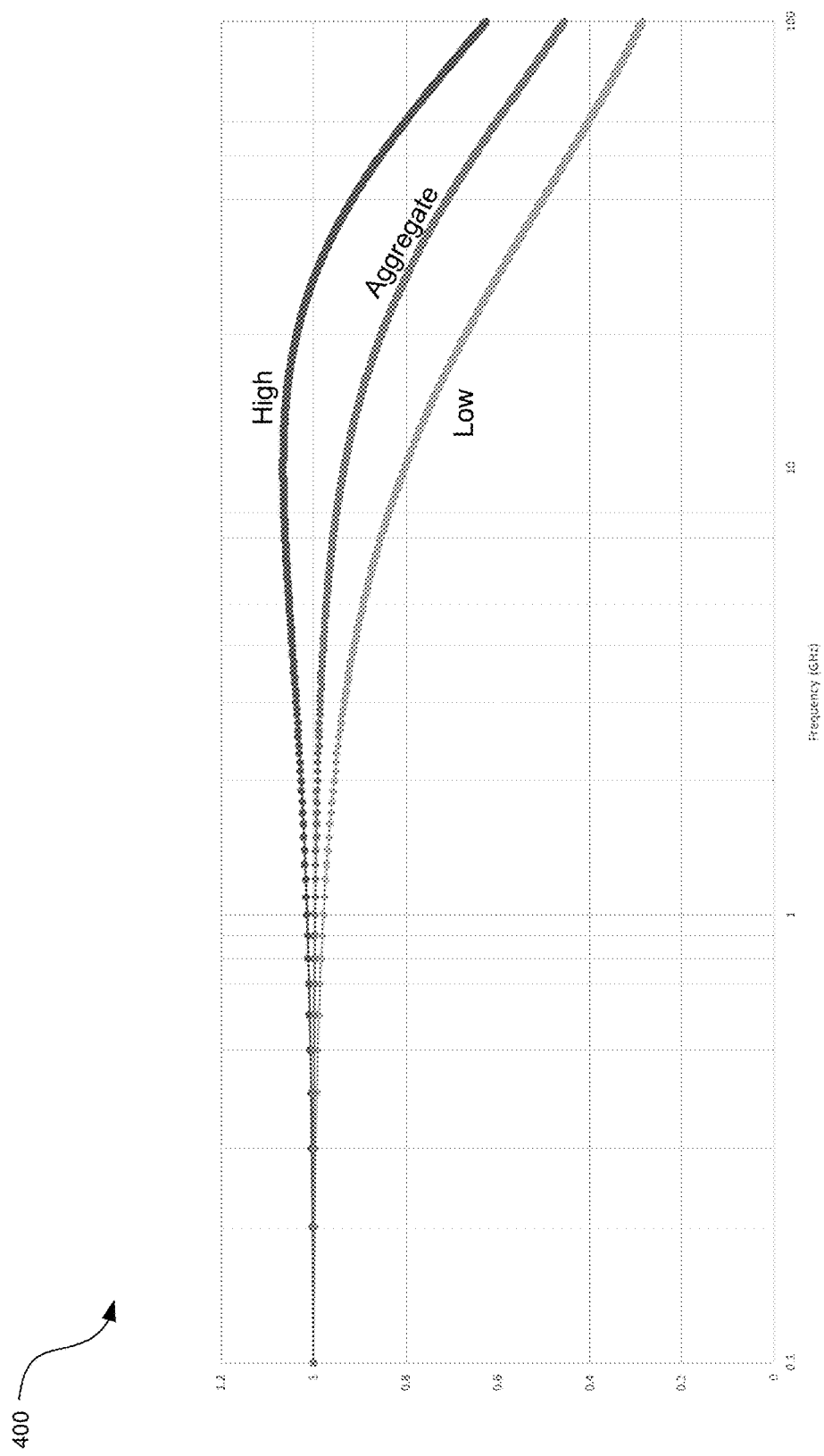
FIG. 4 is a plot of low, high, and aggregate response for a frequency diverse interferometer, in accordance with an embodiment of the disclosure.

FIG. 4 is a plot of low, high, and aggregate response for a frequency diverse interferometer, in accordance with an embodiment of the disclosure. Referring to FIG. 4 there is shown a frequency response plot 400 showing the high frequency domain response of the smaller CMOS node circuits, the low frequency domain response for the higher power devices, and the aggregate response of the MZI modulator, where the aggregate response curve shows 3 dB response out to 100 GHz. This aggregate structure enables higher phase shift per unit length, link budget improvement, smaller transmitter size, and less sensitivity to electro-optical velocity matching.

Figure 5:
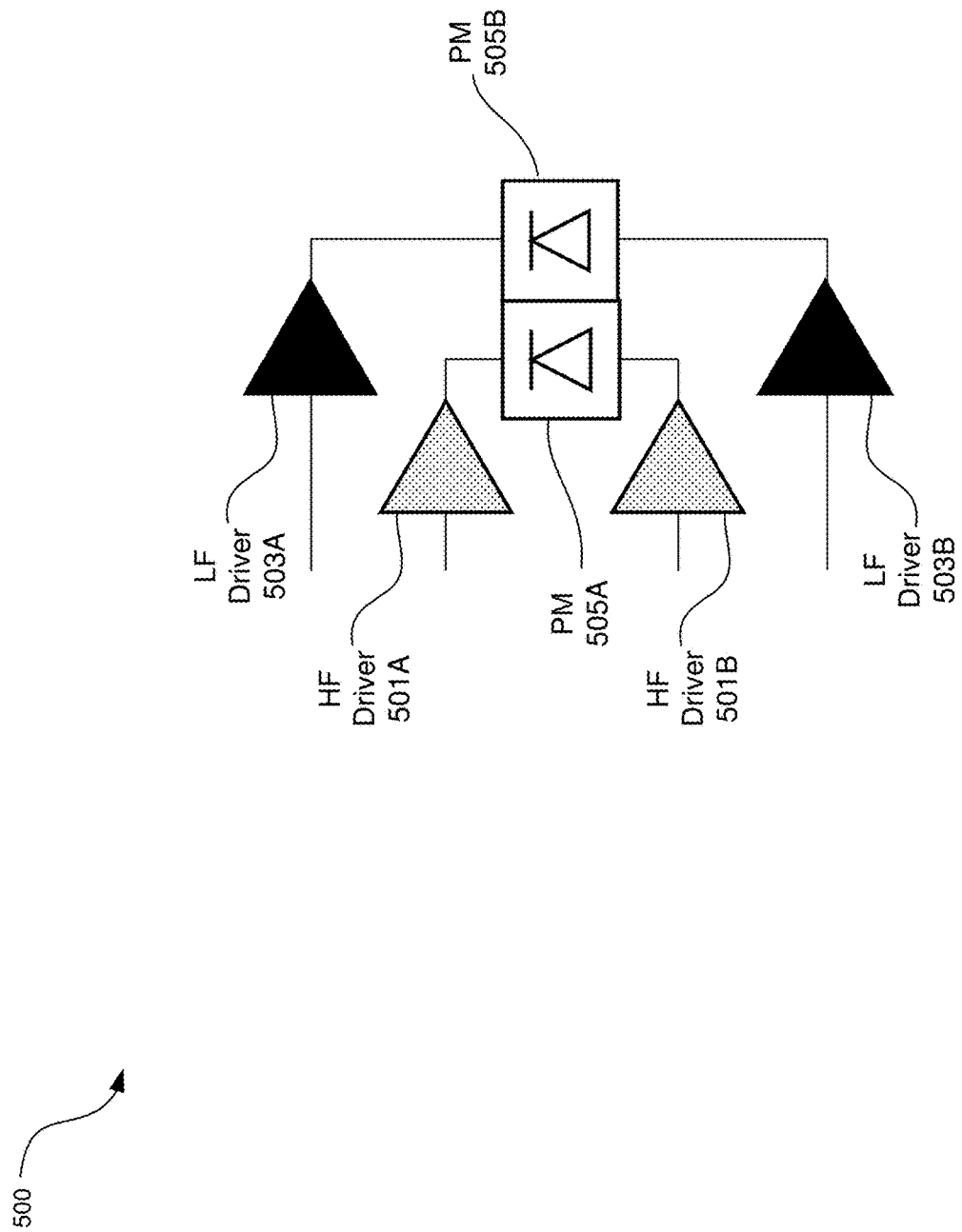
FIG. 5 is a schematic of a segmented frequency division distributed interferometer, in accordance with an example embodiment of the disclosure.

FIG. 5 is a schematic of a segmented frequency division distributed interferometer, in accordance with an example embodiment of the disclosure. Referring to FIG. 5, there is shown a driver/phase modulation section 500 of a Mach-Zehnder Interferometer modulator with high frequency drivers 501A and 501B, low frequency drivers 503A and 503B, and phase modulators 505A and 505B. In this example, each phase modulator 505A/505B is driven by two high frequency or low frequency drivers.

The high frequency drivers 501A and 501B may comprise higher speed, lower voltage CMOS circuits with thin oxide devices, while the low frequency drivers 503A and 503B may comprise lower speed, higher voltage CMOS circuits with thick oxide devices. In an example scenario, the voltage ranges for the low and high speed drivers may be ~0-0.85V for the high speed circuits and 0-1.5V for the low speed circuits, although other voltages are possible depending on the device size and/or oxide thickness, for example.

The voltage ranges may be defined by different voltage rails. For example, in this segmented frequency division example, there may be up to four voltage rails, at 0.85V, 1.5V, 1.7V, and 3.0V to accommodate the different voltages for best performance of each of the different types of devices, with each driver 501A/501B and 503A/503B with different voltage ranges. The phase modulators 505A and 505B may comprise PN junction diodes arranged on a section of an optical waveguide, as illustrated in FIGS. 3 and 4, where a change in bias of the diode changes the index of refraction for the optical signals passing through. Similar driver/phase modulator sections may be situated along a length of each waveguide in the modulator, which ends with a directional coupler with two outputs, one carrying an output signal and the other carrying its complement. In the segmented frequency division example, two separate drivers of a particular frequency, high or low, are used for each phase modulator 505A and 505B.

The drivers 501A/501B and 503A/503B comprise circuitry for phase modulators 505A and 505B in an even-coupled mode, where the signal out of each pair of pair is equal except with a DC offset. In this manner, two or more voltage domains may be utilized to drive the diodes that generate index changes in the respective branches of the MZM.

Figure 6:
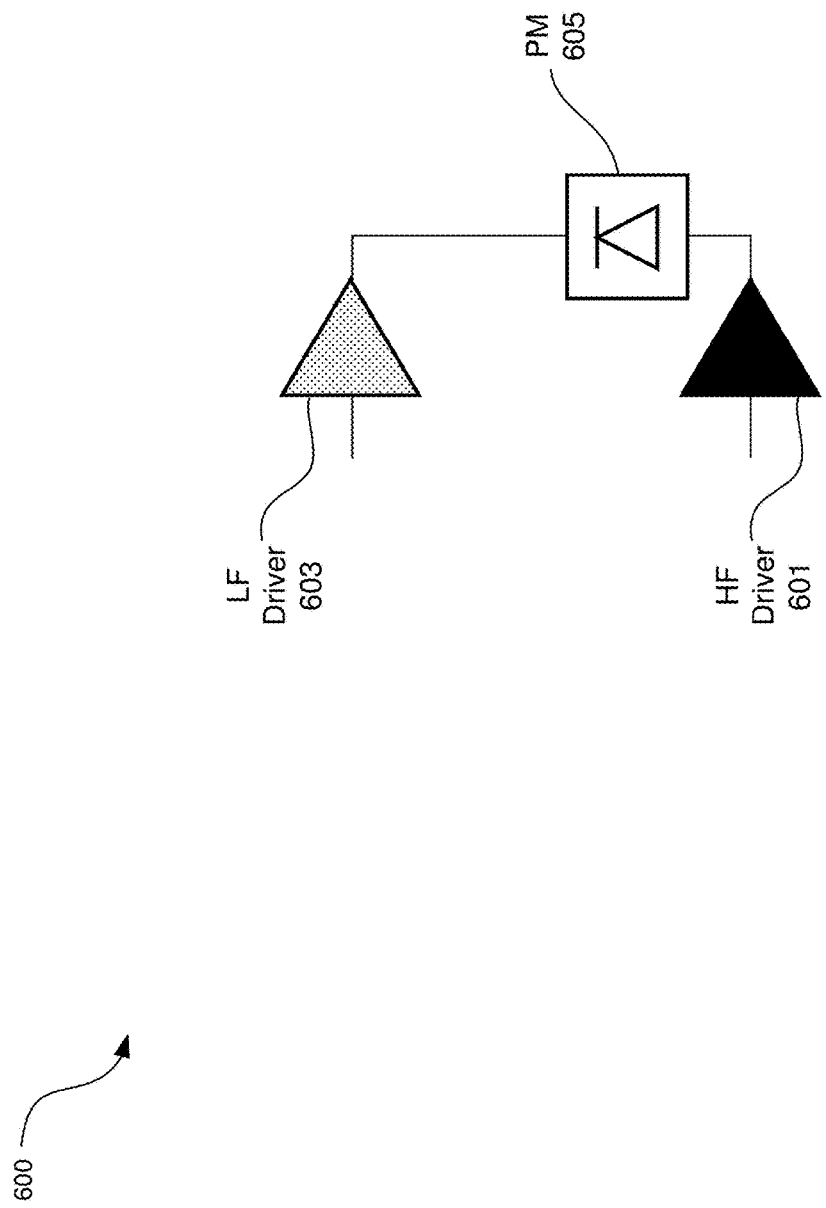
FIG. 6 illustrates a domain frequency division distributed interferometer, in accordance with an example embodiment of the disclosure.

FIG. 6 illustrates a domain frequency division distributed interferometer, in accordance with an example embodiment of the disclosure. Referring to FIG. 6, there is shown a driver/phase modulation section 600 of a Mach-Zehnder Interferometer modulator with high frequency driver 601, low frequency driver 603, and phase modulator 605.

The high frequency driver 601 may comprise higher speed, lower voltage CMOS circuits with thin oxide devices, while the low frequency driver 603 may comprise lower speed, higher voltage CMOS circuits with thick oxide devices. In an example scenario, the voltage ranges for the drivers may be ~0-0.85V for high speed drivers and 0-1.5V for the low speed drivers, although other voltages are possible depending on the device size and/or oxide thickness, for example.

The voltage ranges may be defined by different voltage rails. For example, in this domain frequency division example, there may be two voltage rails, at 0.85V and 2.3V to accommodate the different voltages for best performance of each of the different types of devices. The phase modulator 605 may comprise a PN junction diode arranged on a section of optical waveguide where a change in bias of the diode changes the index of refraction for the optical signals passing through. Similar driver/phase modulator sections may be situated along a length of parallel branches of waveguides in the modulator, which ends with a directional coupler with two outputs, one carrying an output signal and the other carrying its complement, as illustrated in FIGS. 3 and 4. In the domain frequency division example shown here, a single phase modulator, phase modulator 605, is used in each section along the length of the modulator, as opposed to the two separate phase modulator sections for each voltage domain/range in the segmented frequency division embodiment of FIG. 5.

Figure 7A:
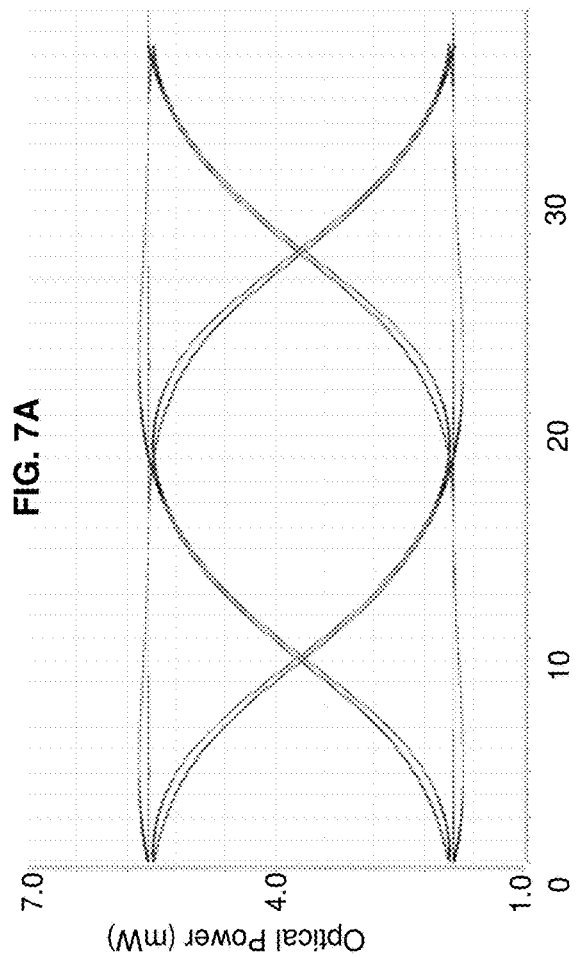
FIGS. 7A and 7B illustrate eye patterns for a baseline structure and a segmented frequency division interferometer, in accordance with an example embodiment of the disclosure.
Figure 7B:
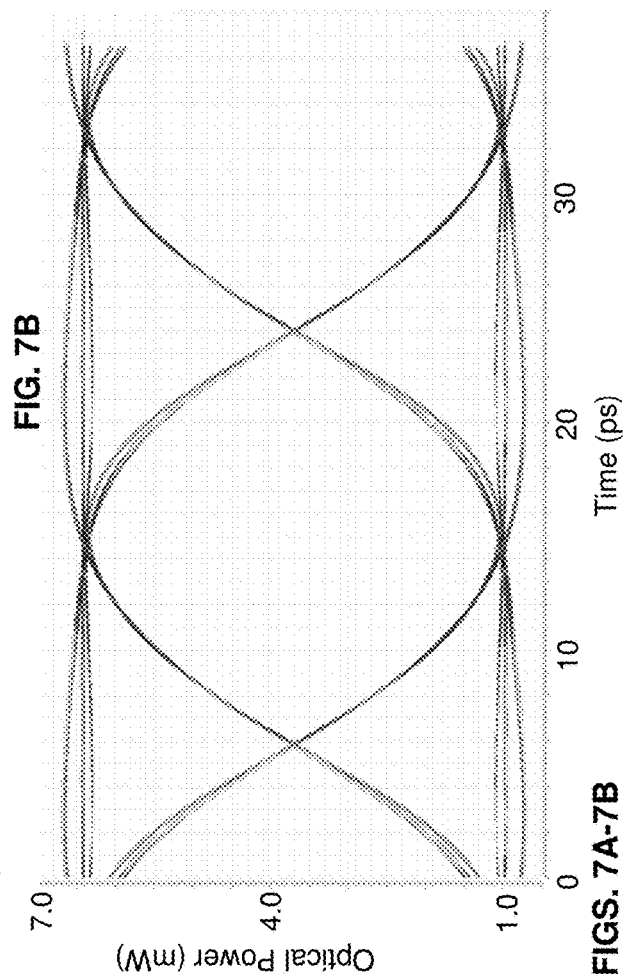

FIGS. 7A and 7B illustrate eye patterns for a baseline structure and a segmented frequency division interferometer, in accordance with an example embodiment of the disclosure. Referring to FIG. 7A, the plot shows an eye pattern for a baseline structure with thin oxide only and the plot of FIG. 7B shows an eye pattern for a segmented frequency division interferometer as shown in FIG. 5, with a 55GBD non-return to zero, (NRZ) driving signal. The modulator length in this example is 2.1 mm, and the extinction ratio, the ratio of ON vs OFF for the modulator, is ~4.5 dB for the baseline structure and ~7.7 dB for the segmented structure, demonstrating the improvement with the segmented frequency division design.

Figure 8A:
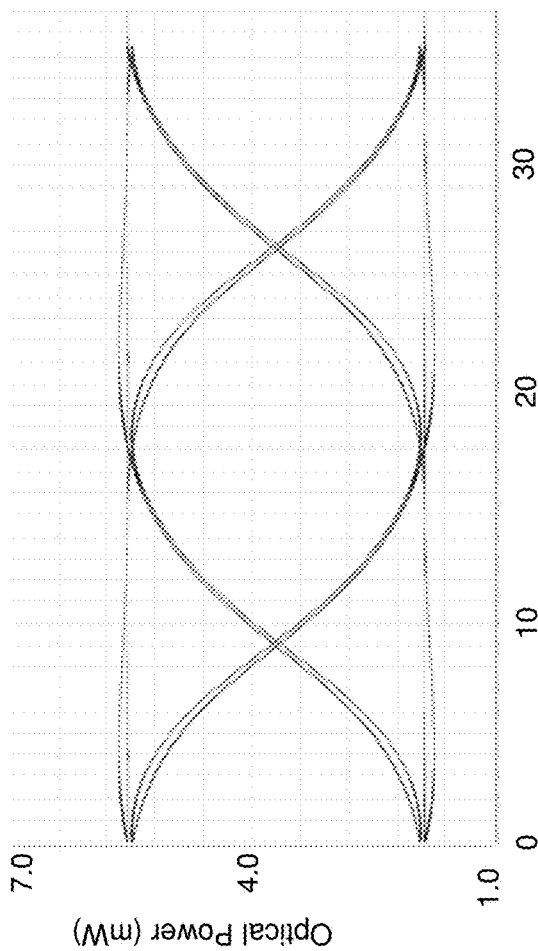
FIGS. 8A and 8B illustrate eye patterns for a baseline structure and a domain frequency division interferometer, in accordance with an example embodiment of the disclosure.
Figure 8B:
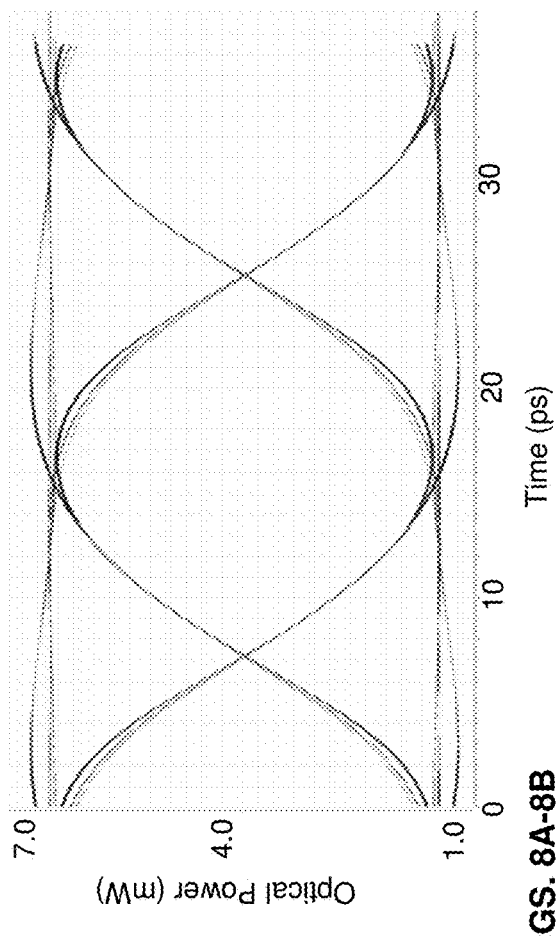

FIGS. 8A and 8B illustrate eye patterns for a baseline structure and a domain frequency division interferometer, in accordance with an example embodiment of the disclosure. Referring to FIG. 8A, the plot shows an eye pattern for a baseline structure with thin oxide only and the plot of FIG. 8B shows an eye pattern for a domain frequency division interferometer as shown in FIG. 6, with a 55GBD-NRZ driving signal. The modulator length in this example is 2.1 mm, and the extinction ratio is ~4.5 dB for the baseline structure and ~7.7 dB for the domain frequency division structure, similar to the segmented structure, demonstrating the improvement with the domain frequency division design.

Figure 9A:
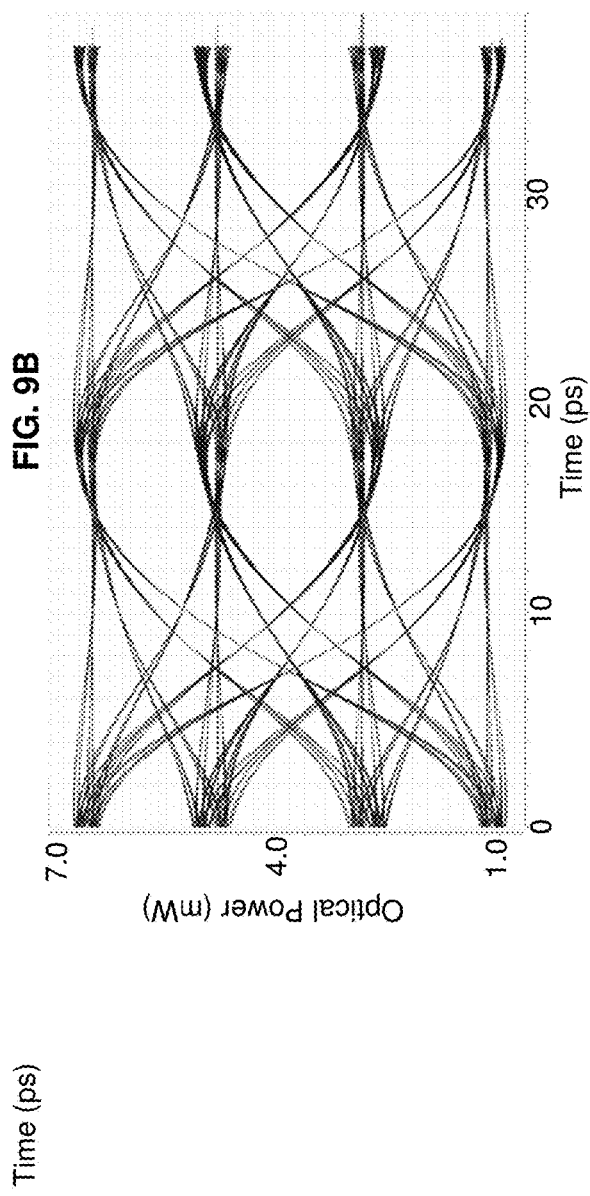
FIGS. 9A and 9B illustrate eye patterns for a domain frequency division interferometer with an NRZ input and a PAM-4 input signal, in accordance with an example embodiment of the disclosure.
Figure 9B:
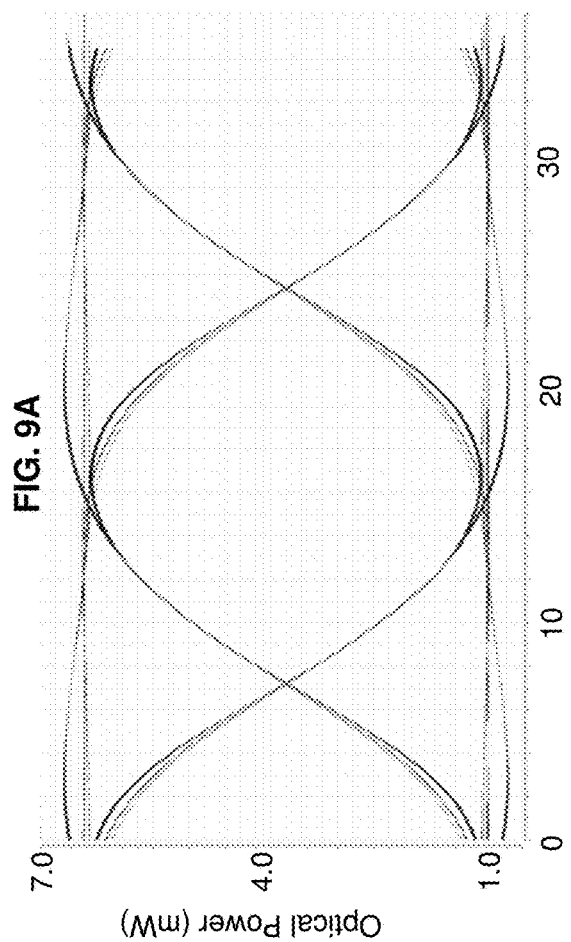

FIGS. 9A and 9B illustrate eye patterns for a domain frequency division interferometer with an NRZ input and a PAM-4 input signal, in accordance with an example embodiment of the disclosure. Referring to FIG. 9A, there is shown an eye pattern for a domain frequency division interferometer, similar to that shown in FIG. 6, with a 55GBD-NRZ signal, and in the plot of FIG. 9B, there is shown an eye pattern for the domain frequency division interferometer with a 55GBD pulse amplitude modulation 4-level (PAM-4) input signal. As shown in FIG. 9B, the interferometer still exhibits an open eye pattern with ~7.7 dB extinction ratio for PAM-4 signals with a 2.1 mm length modulator.

Figure 10A:
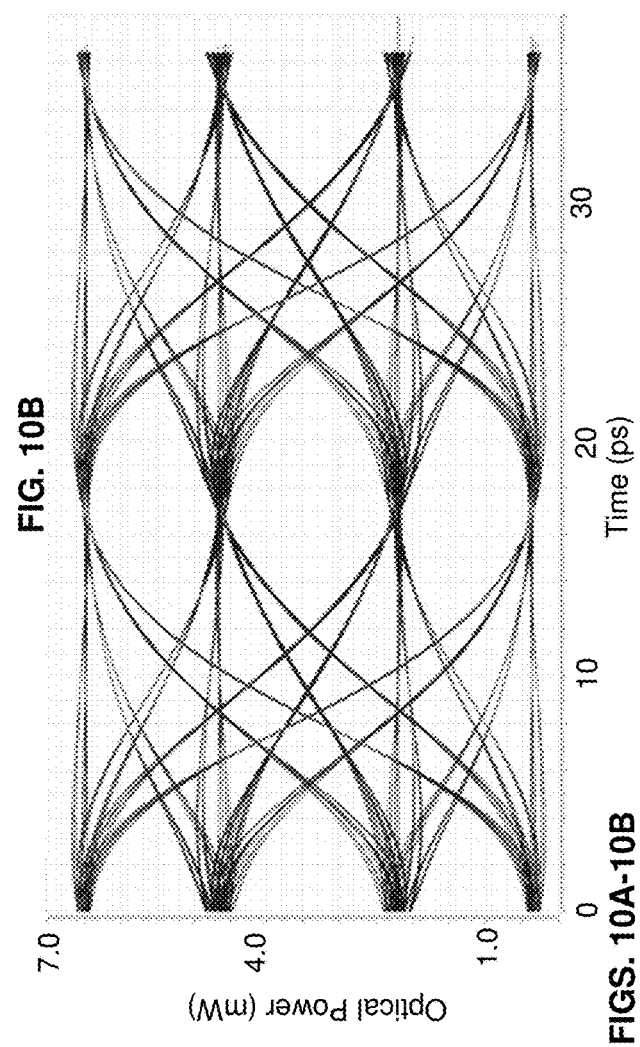
FIGS. 10A and 10B illustrate eye patterns for domain frequency division interferometers of different lengths with a PAM-4 input signal, in accordance with an example embodiment of the disclosure.
Figure 10B:
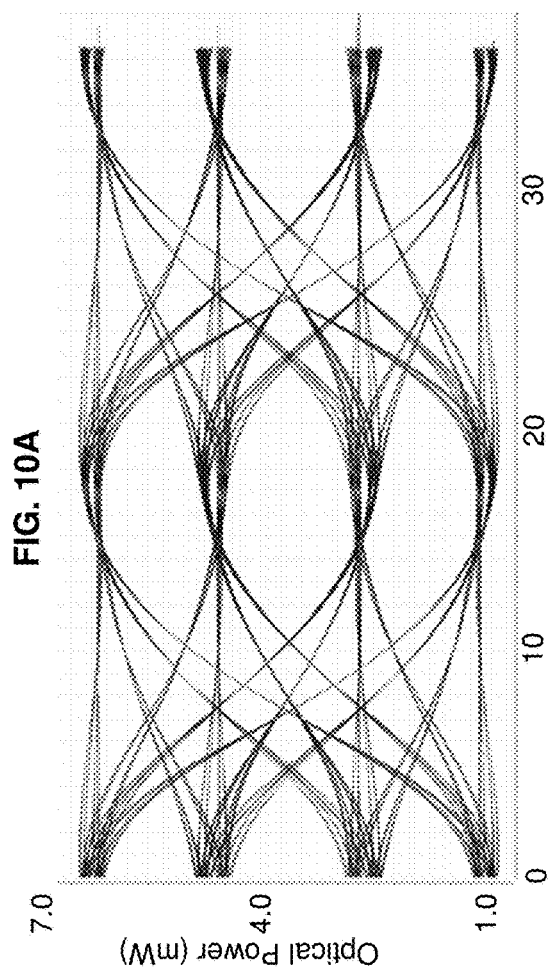

FIGS. 10A and 10B illustrate eye patterns for domain frequency division interferometers of different lengths with a PAM-4 input signal, in accordance with an example embodiment of the disclosure. Referring to FIG. 10A, there is shown an eye pattern for domain frequency division interferometer, similar to that shown in FIG. 6, with a 55GBD-PAM-4 signal, and in the plot of FIG. 10B, an eye pattern for the domain frequency division interferometer with the same input signal but with a longer modulator length of 2.8 mm as compared to the 2.1 mm length for FIG. 10A. As can be seen in the plot of FIG. 10B, the interferometer exhibits an open eye pattern with ~12.3 dB extinction ratio for PAM-4 signals as compared to ~7.7 dB for the 2.1 mm length modulator.

In an example embodiment, a method and system are described for a frequency diverse distributed Mach-Zehnder Interferometer, and may comprise an optical modulator on a chip, with the modulator comprising a plurality of diodes arranged along a waveguide, and where each diode is driven by two or more drivers. The modulator may receive an optical signal in the waveguide and apply a first modulating electrical signal to a first of the plurality of diodes using a first driver, and apply a second modulating electrical signal to the first of the plurality of diodes using a second driver. The first electrical signal may be different from the second modulating electrical signal.

The second modulating electrical signal may have a larger voltage swing than the first modulating electrical signal. The first modulating electrical signal voltage swing may be 0.85 volts and the second modulating electrical signal voltage swing may be 1.5 volts. The first and second modulating electrical signals may have different frequencies. A CW optical signal received via the waveguide may be modulated using the first and second modulating electrical signals. Voltage may be supplied to the drivers using four voltage rails. A third modulating electrical signal may be applied to a second of the plurality of diodes adjacent to the first diode using a third driver and a fourth modulating electrical signal may be applied to the second diode using a fourth driver.

The first and second modulating electrical signals may be in a higher frequency range than the third and fourth modulating electrical signals. The first and second modulating electrical signals may have a same voltage swing but in different voltage domain. The third and fourth modulating electrical signals may have a same voltage swing but in different voltage domain.

In another example embodiment, a method and system are described for a frequency diverse distributed Mach-Zehnder Interferometer, and may comprise an optical modulator on a chip, with the modulator comprising a plurality of diodes arranged along a waveguide, and where each diode is driven by two or more drivers. The optical modulator may be operable to receive an optical signal in the waveguide; apply a first modulating electrical signal at a first frequency to a first of the plurality of diodes using a first driver and apply a second modulating electrical signal at the first frequency to the first of the plurality of diodes using a second driver; and apply a third modulating electrical signal at a second frequency to a second of the plurality of diodes using a third driver and apply a fourth modulating electrical signal at the second frequency to the second of the plurality of diodes using a second driver. The first frequency may be higher than the second frequency. The first and second modulating electrical signals may have a smaller voltage swing than the third and fourth modulating electrical signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
receiving an optical signal in a waveguide comprising a plurality of diodes arranged along the waveguide, wherein each diode of the plurality of diodes is driven by at least two drivers;
applying a first modulating electrical signal to a first diode of the plurality of diodes via a first driver and a second modulating electrical signal to the first diode of the plurality of diodes via a second driver, wherein the first modulating electrical signal is different from the second modulating electrical signal; and
applying a third modulating electrical signal via a third driver and a fourth modulating electrical signal via a fourth driver to a second diode of the plurality of diodes, wherein the first diode and the second diode are disposed on a first branch of the waveguide, wherein a maximum voltage range applied to the first diode is different than a maximum voltage range applied to the second diode.

2. The method according to claim 1, wherein the second modulating electrical signal has a larger voltage swing than the first modulating electrical signal.

3. The method according to claim 2, wherein the first modulating electrical signal voltage swing is 0.85 volts and the second modulating electrical signal voltage swing is 1.5 volts.

4. The method according to claim 1, wherein the first modulating electrical signal and the second modulating electrical signal have different frequencies.

5. The method according to claim 1, comprising modulating a CW optical signal received via the waveguide using the first modulating electrical signal and the second modulating electrical signal.

6. The method according to claim 1, comprising supplying voltage to the first driver and the second driver using four voltage rails.

7. The method according to claim 1, wherein the first modulating electrical signal and the second modulating electrical signal are in a higher frequency range than the third modulating electrical signal and the fourth modulating electrical signal.

8. The method according to claim 7, wherein the first modulating electrical signal has a first voltage swing shared with the second modulating electrical signal and belongs to a first voltage domain that is different from a second voltage domain that the second modulating electrical signal belongs to.

9. The method according to claim 7, wherein the third modulating electrical signal has a second voltage swing shared with the fourth modulating electrical signal and belongs to a third voltage domain that is different from a fourth voltage domain that the fourth modulating electrical signal belongs to.

10. A system comprising:
an optical modulator on a chip, the optical modulator comprising a plurality of diodes arranged along a waveguide, wherein each diode is driven by two or more drivers, the optical modulator being operable to:
receive an optical signal in the waveguide;
apply a first modulating electrical signal to a first diode of the plurality of diodes via a first driver and a second modulating electrical signal to the first diode of the plurality of diodes via a second driver, wherein the first modulating electrical signal is different from the second modulating electrical signal; and apply a third and fourth modulating electrical signal to a second diode of the plurality of diodes using a respective third and fourth driver, wherein the first diode and the second diode are disposed on a same branch of the waveguide, wherein a maximum voltage range applied to the first diode is different than a maximum voltage range applied to the second diode, and wherein the first modulating electrical signal is different from the second modulating electrical signal.

11. The system according to claim 10, wherein the second modulating electrical signal has a larger voltage swing than the first modulating electrical signal.

12. The system according to claim 11, wherein the first modulating electrical signal voltage swing is 0.85 volts and the second modulating electrical signal voltage swing is 1.5 volts.

13. The system according to claim 10, wherein the first modulating electrical signal and the second modulating electrical signal have different frequencies.

14. The system according to claim 10, wherein the optical modulator is operable to modulate a CW optical signal received via the waveguide using the first modulating electrical signal and the second modulating electrical signal.

15. The system according to claim 10, wherein the first driver and second driver receive supply voltage using four voltage rails.

16. The system according to claim 10, wherein the first modulating electrical signal and the second modulating electrical signal are in a higher frequency range than the third modulating electrical signal and the fourth modulating electrical signal.

17. The system according to claim 16, wherein the first modulating electrical signal and the second modulating electrical signal share a first voltage swing but are in different voltage domains, and the third modulating electrical signal and the fourth modulating electrical signal share a second voltage swing but are in different voltage domains.

18. A system for communication, the system comprising:
an optical modulator on a chip, the optical modulator comprising a plurality of diodes arranged along a waveguide, wherein each diode is driven by two or more drivers, the optical modulator being operable to:
receive an optical signal in the waveguide;
apply a first modulating electrical signal at a first frequency to a first diode of the plurality of diodes using a first driver;
apply a second modulating electrical signal at the first frequency to the first diode of the plurality of diodes using a second driver;
apply a third modulating electrical signal at a second frequency to a second diode of the plurality of diodes using a third driver; and
apply a fourth modulating electrical signal at the second frequency to the second diode of the plurality of diodes using a fourth driver,
wherein the first diode and the second diode are disposed on a same branch of the waveguide,
wherein a maximum voltage range applied to the first diode is different than a maximum voltage range applied to the second diode,
wherein the first frequency is higher than the second frequency, and
wherein the first modulating electrical signal and the second modulating electrical signal have a smaller voltage swing than the third modulating electrical signal and the fourth modulating electrical signal.

* * * * *